United States Patent
Kim et al.

(10) Patent No.: US 10,411,465 B2
(45) Date of Patent: Sep. 10, 2019

(54) METHOD OF CONTROLLING THE SUPPLY OF POWER AND ELECTRONIC DEVICE AND ADAPTED THERETO

(71) Applicant: Samsung Electronics Co., Ltd., Gyeonggi-do (KR)

(72) Inventors: Taehoon Kim, Gyeongsangbuk-do (KR); Jeongseob Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 390 days.

(21) Appl. No.: 15/172,219

(22) Filed: Jun. 3, 2016

(65) Prior Publication Data
US 2016/0359322 A1   Dec. 8, 2016

(30) Foreign Application Priority Data
Jun. 4, 2015   (KR) .................. 10-2015-0079168

(51) Int. Cl.
*H02J 1/00*   (2006.01)
*H02J 7/00*   (2006.01)

(52) U.S. Cl.
CPC .............. *H02J 1/00* (2013.01); *H02J 7/007* (2013.01); *H02J 7/0052* (2013.01); *H02J 2007/0062* (2013.01)

(58) Field of Classification Search
CPC .. H02J 1/00; H02J 7/007; H02J 7/0052; H02J 2007/0062

USPC ........................................................ 307/52
See application file for complete search history.

(56) References Cited

U.S. PATENT DOCUMENTS

| 9,122,813 B2 * | 9/2015 | Oljaca ................ G06F 13/4081 |
| 2006/0035527 A1 * | 2/2006 | Numano ................ G06F 1/266 |
| | | 439/668 |
| 2009/0174366 A1 * | 7/2009 | Ahmad ................ H02J 7/0055 |
| | | 320/114 |
| 2013/0238819 A1 * | 9/2013 | Oljaca ................ G06F 13/4081 |
| | | 710/15 |

FOREIGN PATENT DOCUMENTS

KR   10-0643750 B1   11/2006

* cited by examiner

*Primary Examiner* — Jared Fureman
*Assistant Examiner* — Michael J Warmflash
(74) *Attorney, Agent, or Firm* — Cha & Reiter, LLC.

(57) ABSTRACT

An electronic device includes a connector for connecting to an external device; a battery; and a controller operatively coupled to the connector and the battery. The controller includes a power controller configured to: supply the external device with a first signal having a first voltage level in response to detecting that the external device is connected to the connector. The external device is supplied with a second signal having a second voltage level that differs from the first voltage level, in response to detecting that the external device is connected to an external power supply. The first signal is generated at least in part by the battery.

15 Claims, 10 Drawing Sheets

METHOD OF CONTROLLING THE SUPPLY OF POWER AND ELECTRONIC DEVICE AND ADAPTED THERETO

CLAIM OF PRIORITY

This application claims priority under 35 U.S.C. § 119(a) from a Korean Patent Application filed on Jun. 4, 2015 in the Korean Intellectual Property Office and assigned Serial no. 10-2015-0079168, the contents of which are incorporated herein by reference.

BACKGROUND

1. Field of the Disclosure

The present disclosure relates to electronic devices, in general, and more particularly to a method for supplying power and an electronic device performing the method.

2. Description of Related Art

With the development of mobile communication technology and processor technology, according to user demand for something new and different, mobile electronic devices have been evolved to be equipped with new and different functions. In order to allow users to use functions or additional functions of a mobile electronic device more conveniently, external devices configured to connect to the mobile electronic device are required. To this end, various technologies have been proposed and commercialized to connect between mobile electronic devices and external devices, e.g., a mouse device, a keyboard, an external storage device, a wired LAN, High Definition Multimedia Interface (HDMI), a multimedia dock, Head-mounted display (HMD), etc. For connection with external devices, mobile electronic devices have supported standardized interface such as Universal Serial Bus (USB), etc. In addition to USB, mobile electronic devices have been internally equipped with an additional interface to perform data communication with external devices.

Mobile electronic devices with a USB connector allow various external devices (or accessories) to be attached thereto in On-The-Go (OTG), thereby use functions of the external devices. On-The-Go (OTG) is a USB specification supporting USB communication between mobile electronic devices such as smartphones, tablet personal computers (PCs), etc. or between a mobile electronic device and its peripheral such as a mouse device, a keyboard, a USB memory, etc., without the use of a personal computer (PC). In recent years, external devices capable of connecting to a mobile electronic device via OTG have increased in variety. For example, an OTG hub has been developed, allowing a number of external devices to be attached to one mobile electronic device.

A mobile electronic device and an external device are connected to a USB connector of the mobile electronic device. Since an external device connected to a mobile electronic device via OTG (where the external device is hereafter called an OTG device) is not equipped with a separate power source, it receives its operating power from the mobile electronic device via the USB connector of the mobile electronic device. When a mobile electronic device detects the OTG connection of an external device, its internal power control module activates a reverse boost function to adjust (step up or down) the output power of the battery to a preset level in order to supply the adjusted power to the OTG device.

When a mobile electronic device with an OTG device connected thereto is running, it needs to supply power from the battery to the OTG device and increases in its level of power consumption. In order to reduce power consumption in the mobile electronic device with an OTG device, it frequently uses an external power supply, e.g., Travel Adapter (TA). In this case, the mobile electronic device supplies power from the external power supply to the OTG device and also charges the charge module with power received via the connector from the external power supply.

As described above, when a mobile electronic device is connected to an OTG device and an external power supply, the conventional system supplies power from the external power supply to the OTG device but does not need to supply power from the mobile electronic device to the OTG device. Therefore, the conventional system blocks power supplied from the built-in battery of the mobile electronic device to the OTG device via the connector.

When the external power supply is removed from the mobile electronic device with the OTG device attached thereto, the OTG device inevitably experiences a temporary interruption of the supply of power thereto. That is, although the mobile electronic device detects the removal of the external power supply and activates the reverse boost function, it will take a period of time (e.g., tens of milliseconds) to supply power to the OTG device from the disconnection with the external power supply, so disconnection with the OTG device may occur. In this case, it may take a few seconds until the OTG device is reset and re-connected to the mobile electronic device.

Therefore, a system is required to resolve these problems and maintain the connection between the OTG device and the mobile electronic device, regardless of connection or disconnection with an external power supply.

The foregoing description of related art is merely intended to provide a better understanding of the background of the disclosure. Therefore, it should not be understood that the technology in the description of related art has already well-known to those skilled in the art.

SUMMARY

According to aspects of the disclosure, an electronic device is provided, comprising: a connector for connecting to an external device; a battery; and a controller operatively coupled to the connector and the battery, the controller comprising a power controller configured to: supply the external device with a first signal having a first voltage level in response to detecting that the external device is connected to the connector; and supply the external device with a second signal having a second voltage level that differs from the first voltage level, in response to detecting that the external device is connected to an external power supply, wherein the first signal is generated at least in part by the battery.

According to aspects of the disclosure, a method for use in an electronic device is provided, comprising: detecting a connection with an external device; supplying the external device with a first signal having a first voltage level in response to detecting the connection; and detecting that the external device is connected to an external power supply; and supplying the external device with a second signal having a second voltage level that differs from the first voltage level, in response to detecting that the external device is connected to the external power supply, wherein the first signal is generated at least in part by a battery.

According to aspects of the disclosure, a non-transitory computer-readable medium is provided that stores one or more processor-executable instructions, which when executed by at least one processor cause the processor to perform a method comprising the steps of: detecting a connection with an external device; supplying the external device with a first signal having a first voltage level in response to detecting the connection; and detecting that the external device is connected to an external power supply; and supplying the external device with a second signal having a second voltage level that differs from the first voltage level, in response to detecting that the external device is connected to the external power supply, wherein the first signal is generated at least in part by a battery.

BRIEF DESCRIPTION OF THE DRAWINGS

The above and other aspects, features and advantages of the disclosure will be more apparent from the following detailed description, taken in conjunction with the accompanying drawings, in which.

DETAILED DESCRIPTION

Figure 1:
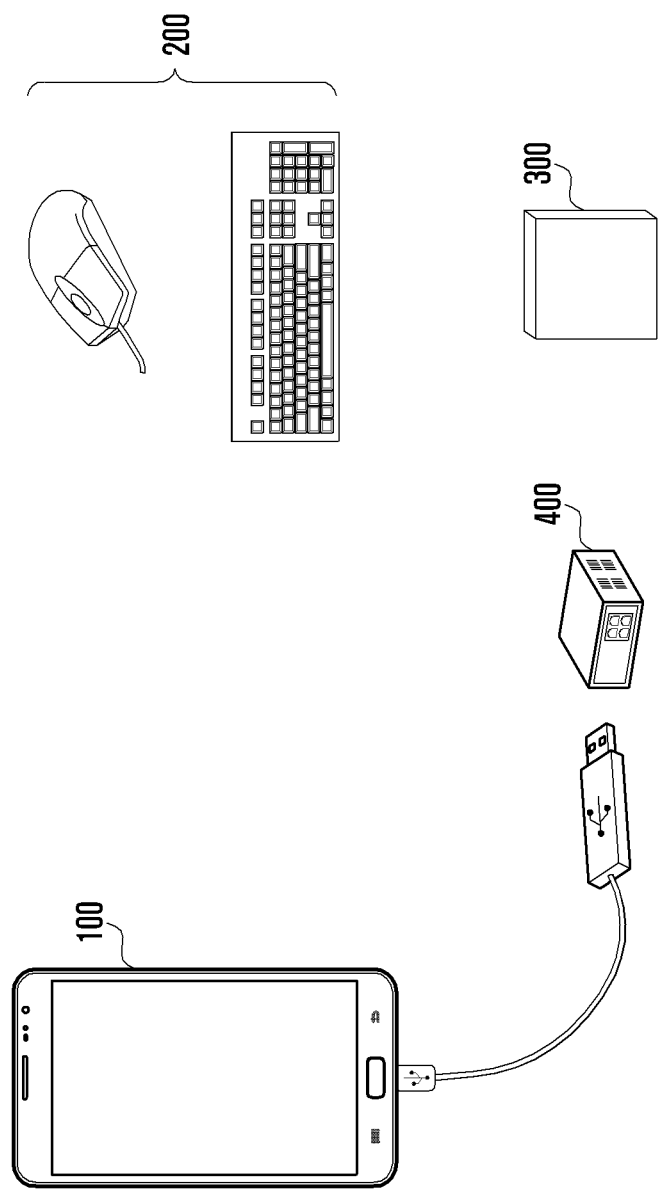
FIG. 1 is a diagram of an example of a system according to various embodiments of the present disclosure.

The terms expressed in the present disclosure are only used to describe specific various embodiments, and are not intended to limit the present disclosure. Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted. All terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Hereinafter, embodiments of the present disclosure will be described with reference to the accompanying drawings.

In the drawings, the same or similar elements are denoted by the same reference numerals even though they are depicted in different drawings. Detailed descriptions of well-known functions and structures incorporated herein may be omitted to avoid obscuring the subject matter of the disclosure. It should be understood that the accompanying drawings are merely provided to assist in a comprehensive understanding of the disclosure and are not suggestive of limitation. It should also be understood that the present disclosure includes various modifications, equivalents and/or alternatives from the embodiments.

FIG. 1 is a diagram of an example of a system, according to various embodiments of the present disclosure. As illustrated, the system may include an electronic device 100, an external device 200, an external device 300, and On-The-Go (OTG) hub 400.

The electronic device 100 may be implemented with a mobile electronic device which is equipped with wired and/or wireless communication functions, includes one or more processors, and executes various applications. Examples of the electronic device 100 are a smartphone, a tablet PC, a laptop PC, Personal Digital Assistance (PDA), etc. but not limited thereto. It should be understood that the electronic device 100 may include any suitable type of electronic device that is capable of interfacing with an external device 200.

The electronic device 100 may interface with an external device 200. The electronic device 100 may connect to the external device 200, via Universal Serial Bus (USB). To this end, the electronic device 100 may be equipped with a standard type input port based on the USB protocol.

The external device 200 may refer to accessories capable of connecting to the electronic device 100 via a wired connection. Examples of the external device 200 are a mouse device, a keyboard, an external storage device, a wired LAN, High Definition Multimedia Interface (HDMI), a multimedia dock, Head-mounted display (HMD), etc. The external device 200 includes an external port which is connected to the USB connector of the electronic device 100.

The external device 200 is connected to the electronic device 100 via OTG On-The-Go (OTG) is a USB specification supporting USB communication between mobile electronic devices such as smartphones, tablet personal computers (PCs), etc. or between an electronic device and its peripheral such as a mouse device, a keyboard, a USB memory, etc., without the use of a personal computer (PC). In the following description, the external device 200 connected to an electronic device via OTG is also called an OTG device. The external device 200 may also refer to devices supporting USB, such as charging devices, PCs, etc., as well as OTG devices.

The external device 200 (e.g., an OTG device) does not include a separate power source. When the external device 200 is attached to the electronic device 100, it needs to receive power from the electronic device 100. The electronic device 100 may supply constant voltage (e.g., 5 V) from the battery to the external device 200 via the USB connector, i.e., the power supply pin (e.g., the Vcc pin) of the USB connector, defined in the USB specification.

More specifically, when the electronic device 100 is connected to the external device 200, it may detect that the connection has been established along with the type of the external device 200. When the electronic device 100 detects the connection with an OTG device, it activates a reverse boost function. The reverse boost function refers to a process where the electronic device 100 steps up (or down) the output voltage of the battery to a preset level and outputs the stepped-up (stepped-down) voltage to the USB connector, in order to supply power to the OTG device. After activating the reverse boost function, the electronic device 100 supplies power to the external device 200 and transmits/receives data to/from the external device 200.

The external device 200 may be connected to an external power supply 300 in order to receive power therefrom. When the external device 200 is connected to the electronic device 100, it may receive power from the battery of the electronic device 100. In order to reduce power consumption in the battery of the electronic device 100, it may be further connected to a Travel Adapter (TA) as one of the external power supply 300.

In order to connect the external device 200 and the external power supply 300, an OTG hub device 400 may be employed. The OTG hub device 400 enables a number of external devices such as the external device 200 (or a number of external power supplies such as the external power supply 300) to connect to the electronic device 100 simultaneously.

When the external power supply 300 is connected to the external device 200 which is attached to the electronic device 100 via OTG, the reverse boost function is not activated in the electronic device 100 and only the external power supply 300 supplies power to the external device 200. When the external power supply 300 is removed from the OTG device attached to the electronic device 100, the OTG device inevitably experiences a temporary interruption of the supply of power thereto. In this case, it will take a period of time for the electronic device 100 to receive an interrupt signal due to the disconnection with the external power supply 300 and to activate the reverse boost function. This causes a temporary interruption of power supplying to the external device 200, and also an instantaneous disconnection between the external device 200 and the electronic device 100.

In the following description, referring to FIGS. 2 to 7, a detailed explanation is provided regarding the configuration of the electronic device 100 and its operations to maintain the connection between the OTG device and the electronic device 100, regardless of connection or disconnection with the external power supply 300.

Figure 2:
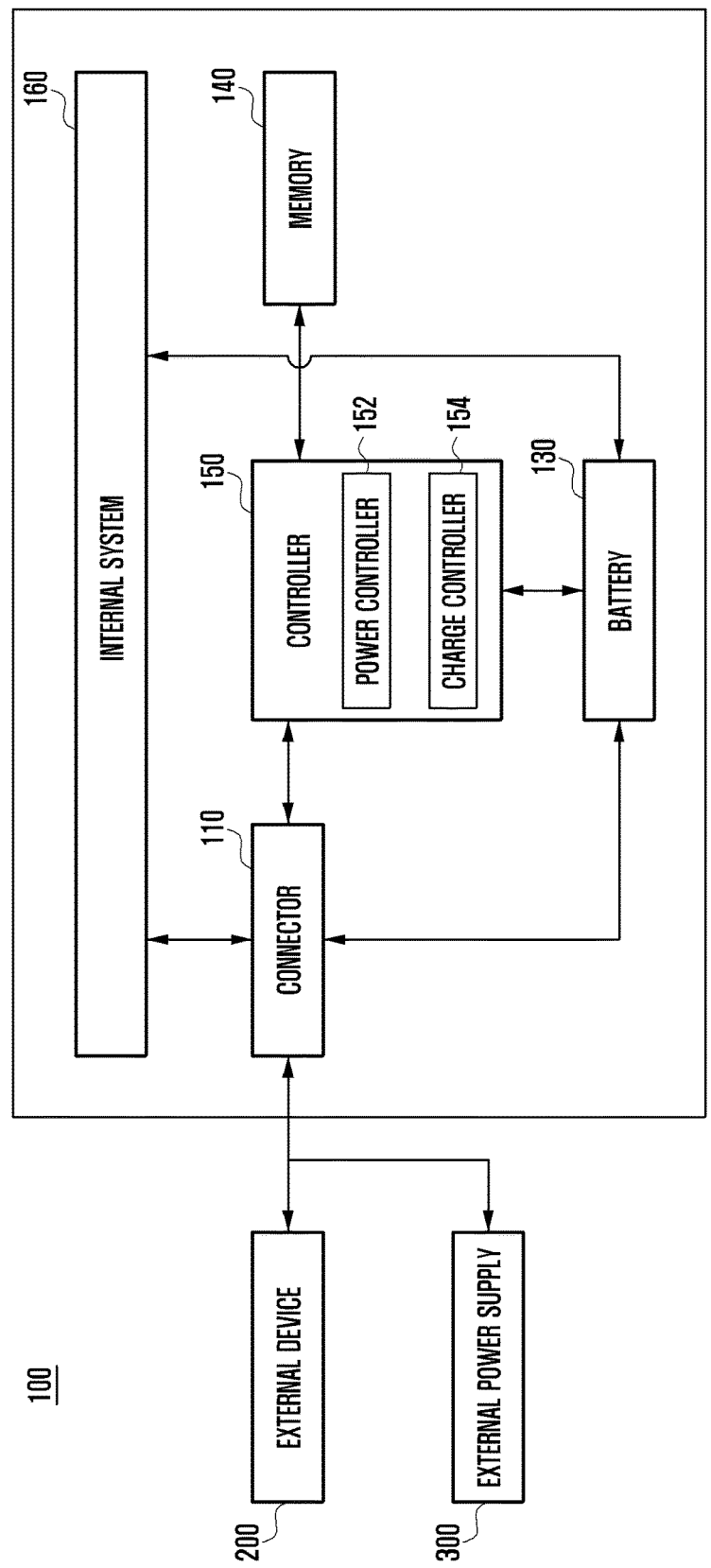
FIG. 2 is a block diagram of an example of an electronic device according to a first embodiment of the present disclosure.

FIG. 2 is a block diagram of an example of an electronic device, according to a first embodiment of the present disclosure.

The electronic device 100 may include a connector 110, a battery 130, a controller 150, a memory 140 and an internal system 160. The controller 150 includes a power controller 152 and a charge controller 154. The internal system 160 may include hardware or software modules which are included or may be included in the electronic device 100. It should be understood that the embodiment may also be modified in such a way that at least some of the components listed above are omitted or replaced with other components, and the modifications are also included within the scope of the present disclosure.

It should be understood that the electronic device 100 are a smartphone, a tablet PC, a laptop PC, Personal Digital Assistance (PDA), etc. but not limited thereto. That is, the electronic device 100 may include any suitable type of electronic device that is capable of interfacing with an external device 200.

The connector 110 corresponds to a port to which the external device 200 is connected. It should be understood that the connector 110 is used in the sense including a USB receptacle following a USB specification. It also should be understood that the connector 110 may also refer to any type of ports which are commercialized or can be used for the electronic device 100, following the wire interface specification. For example, the connector 110 is implemented with a USB interface. An example of the USB interface is a standard 24-pin connector. The standard 24-pin connector may use five types of USB signaling ports (VBUS, DATA+, DATA−, GND, and ID) in order to support a USB OTG function.

When the connector 110 is connected or disconnected from the external device 200, the controller 150 may detect the connection and the disconnection between the connector 110 and the external device 200 and generating interrupt signals. The controller 150 may also detect a type of external device 200, based on a signal received when the external device 200 is connected to the connector 110. More specifically, the controller 150 may determine whether the external device 200 connected to the connector 110 is an OTG device, based on data input to the ID pin of the connector 110. In particular, the controller 150 may determine whether the external device 200 connected to the connector 110 is an OTG device, based on data input to the data pins (DATA+ and DATA−) of the connector 110 for a USB standard such as USB 3.0, etc. In addition, the controller 150 may detect a type of OTG device connected to the connector 110, e.g., a mouse device, a keyboard, a USB memory, etc., based on data input to the data pins of the connector 110.

When the external power supply 300 is connected to the external device 200 or the OTG hub, the controller 150 may recognize the output voltage of the external power supply 300 and detect the connection or disconnection with the external power supply 300.

The battery 130 may be a power source applied to the electronic device 100, e.g., a rechargeable battery, a solar battery, etc. The battery 130 may be charged in wired or wireless mode. The battery 130 may output a constant voltage. The output voltage of the battery 130 may be adjusted to a stepped-up or stepped-down voltage according to the control of the controller 150 and/or an auxiliary power supply module 120 which will be described later.

The memory 140 may include any suitable type of volatile or non-volatile memory, such as Random-access Memory (RAM), Read-Only Memory (ROM), Network Accessible Storage (NAS), cloud storage, a Solid State Drive (SSD), etc. The memory 140 may store data or commands received from or created in other components of the electronic device 100 or a processor. The memory 140 may include programming modules, e.g., kernel, middleware, Application Programming Interface (API), applications, etc. The memory 140 may also store data created in the electronic device 100 or transmitted from the external device 200. The memory 140 may be a non-volatile memory.

The internal system 160 refers to the remaining elements (parts, circuit, etc.) of the electronic device 100 other than the components described above. Examples of the internal system 160 may include a communication module (e.g., RF module, cellular module, a WiFi module, a Bluetooth module, a GPS module, an NFC module, etc.), an input device (e.g., a touch panel, a keypad, sensors, etc.), a display (e.g., a display panel, a projector, etc.), a camera module, an audio module, various types of sensor modules, etc. It should be understood that these examples of the internal system 160 refer to components which can be installed to the electronic device 100. It should be understood that the internal system 160 may also include various types of hardware or software modules which can be installed to the electronic device 100.

The controller 150 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In some implementations, the controller 150 may include a power controller 152 and a charge controller 154. The power controller 152 and the charge controller 154 include a Power Management Integrated Circuit (PMIC) and a charging IC, but are not limited thereto. The power controller 152 or the charge controller 154 does not need to be configured as a hardware module separate from the controller 150. The power controller 152 or the charge controller 154 may be configured as part of functions performed by the controller 150.

The power controller 152 may set the power output from the battery 130 to a particular voltage value, according to the connection or disconnection with the external device 200 and/or the external power supply 300, and output, to the connector 110, a stepped-up or stepped-down voltage of the battery 130 corresponding to the set voltage value.

More specifically, when the power controller 152 detects the connection of the external device 200 to the connector 110 and receives an interrupt signal, it may forward the power, supplied from the battery 130 to the external device 200. More particularly, the power controller 152 may supply the external device with a signal having a first voltage. That is, the power controller 152 may activate a reverse boost function in a first mode and supply power from the battery 130, at a pre-set, first voltage, to the external device 200 via the connector 110. In the embodiment, the first voltage is a constant voltage, e.g., 5 V. The first voltage may be pre-set as a minimum voltage for the operations of external devices connected to the electronic device 100.

As described above, when the connector 110 is connected to the external device 200, the controller 150 may detect a type of the external device 200. When the external device 200 connected is not an OTG device, the electronic device 100 may perform operations corresponding to the type of the external device 200. For example, when the connected external device 200 is a multimedia device via HDMI, the power controller 152 activates a reverse boost function in a first mode, supplies power to the multimedia device, and receives multimedia data therefrom. When the electronic device 100 is singly connected to the external power supply (e.g., TA, etc.), the charge controller 154 of the electronic device 100 does not activate a reverse boost function but charges the battery 130 with the input power of the external power supply.

When the electronic device 100 ascertains that the external device 200 is connected to the external power supply 300, it may continue to supply power to the external device 200. More particularly, when the external device is connected to the external power supply 300, the electronic device 100 may supply the external device with a signal having a second voltage that differs from the first voltage. That is, the power controller 152 activates a reverse boost function in a second mode according to the connection interrupt of the external power supply 300, and sets the power, supplied to the external device 200 via the connector 110, as a second voltage. In the embodiment, the first mode and second mode of the reverse boost function may refer to modes in which the power supplied to the external device 200 via the connector 110 is set to a first voltage or second voltage, respectively, according to a condition as to whether the external power supply 300 is connected.

According to an embodiment of the present disclosure, although the external device 200 receives power from the external power supply 300 additionally connected thereto, a constant voltage may be applied to the connector 110. In this case, although the external power supply 300 is disconnected, current flows from the connector 110 to the external device 200. Therefore, the external device 200 does not experience any interruption of power, so that it can be continuously turned on.

The charge controller 154 may charge the battery 130 of the electronic device 100 by using the current flowing out from the external power supply 300 connected to the external device 200.

When the electronic device 100 detects the connection of the external power supply 300 to the external device 200, it identifies the type of external device 200 connected to the ID pin or the data pin. When the external device 200 is an OTG device, the electronic device 100 sets the power, supplied from the battery 130 to the external device 200, as a second voltage. On the other hand, when the external device 200 is not an OTG device, the electronic device 100 blocks the supply of power from the battery 130 to the external device 200.

In various embodiments of the present disclosure, the reverse boost function is not always activated in a second mode only when the external device 200 is an OTG device. For example, when the electronic device 100 is connected to an external device which needs to receive power from the electronic device 100, such as HDMI, although the external device is not an OTG device, it detects connection of the external power supply 300 and supplies a second voltage to the external device 200. To this end, the electronic device 100 may store, in the memory 140, indication(s) of one or more conditions for supplying power from the battery 130 to one or more external devices based on the types of the external devices.

According to an embodiment of the present disclosure, the second voltage may be smaller than the first voltage. The second voltage may be smaller than a voltage input from the external power supply 300 to the connector 110. When the connector 110 is connected to the external power supply 300, when the voltage of the connector 110 has been set to be smaller than the voltage output from the external power supply 300, current flows from the external power supply 300 to the connector 110, so that the charge controller 154 can charge the battery 130 with the input current.

Various embodiments may be implemented in association with the settings of the second voltage. As an embodiment, the second voltage may be a pre-set voltage value. For example, when the first voltage is set to 5 V, the second voltage may be set to 4.3 V. The second voltage value may be set to one of the values smaller than the first voltage; however, it is preferable that the second voltage value may be set to a minimum voltage required for operations of the external device 200 connected to the electronic device 100. That is, although the external power supply 300 is disconnected, the second voltage value may be greater than or equal to a minimum voltage required to execute the external device 200 connected to the electronic device 100, so that the external device 200 can operate using the power output from the battery 130 of the electronic device 100.

As another embodiment, the memory 140 may store identification information corresponding to at least one external device capable of connecting to the connector 110 and a table that maps the identification information to one or more voltage values that are associated with that device. When the power controller 152 identifies a voltage value mapped to the identifier of the connected external by using the table stored in the memory 140, the power controller 152 may set the identified voltage value as a second voltage. Although in the present example, a table is used to map external device identifier(s) to respective voltage values, it should be understood that any suitable type of data structure can be used instead.

As described above, the external device may include any suitable type of device capable of connecting to electronic device 100, such as, a mouse, a keyboard, a storage device, etc., which may have operating voltages that differ from each other. The electronic device 100 according to the present disclosure may use a table (or any suitable type of data structure) to map identification information corresponding to one or more external devices, (e.g., respective types of the devices, respective models, etc.) to minimum voltage values required for operations according to the external devices and storing them in a table. The electronic device 100 may match a first voltage and a second voltage with individual external devices and store the matched result in a table.

When an external device 200 is connected to the connector 110 of the electronic device 100, the electronic device 100 may obtain identification information corresponding to the connected external device 200, based on data received via the ID pin or data pin of the connector 110. The power controller 152 looks up a voltage value that is mapped to the identification information by the table stored in the memory 140. The electronic device 100 may control the voltage of the connector to the first voltage and the second voltage in the table, according to a condition as to whether it is connected to the external device 200 and/or the external power supply 300.

When the external power supply 300 is connected to the electronic device 100, the power controller 152 sets a second voltage and steps up or down the output voltage of the battery 130 so that the power, supplied to the external device 200 via the connector 110, is the second voltage. Simultaneously, the charge controller 154 activates a battery charging function and charges the battery 130 with the power output from the external power supply 300.

When the external power supply 300 is disconnected from the electronic device 100, the controller 150 recognizes the disconnection with the external power supply 300 via the interrupt signal. The charge controller 154 deactivates the battery charging function to stop the charge of the battery 130. The power controller 152 activates the reverse boost function in a first mode to set the power, supplied to the external device 200 via the connector 110, as a first voltage.

When the external device 200 is disconnected from the electronic device 100, the power controller 152 deactivates the reverse boost function to stop the supply of the first voltage or the second voltage.

Figure 3:
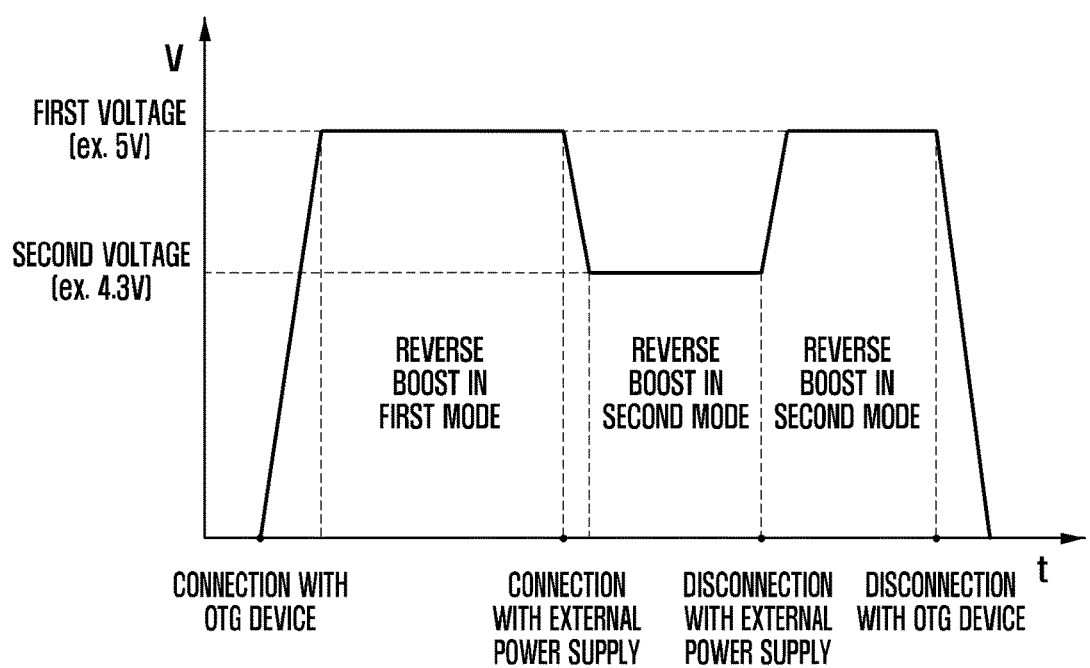
FIG. 3 is a graph of a signal that is supplied to an external device according to various embodiments of the present disclosure.

FIG. 3 is a graph of voltage over time, supplied to an external device 200 when events occur, according to various embodiments of the present disclosure. When the external device 200 is an OTG device, the power controller 152 of the electronic device 100 may control the supply of power to the external device 200 via the connector 110, based on the voltage values shown in FIG. 3.

When the electronic device 100 detects connection with an OTG device, it activates a reverse boost function in a first mode to supply a first voltage to the external device 200.

When the electronic device 100 detects that an external power supply 300 is connected to the external device 200, it activates a reverse boost function in a second mode to supply a second voltage, smaller than the first voltage, to the external device 200. When the external power supply 300 is disconnected from the external device 200, the electronic device 100 activates the reverse boost function in a first mode to supply the first voltage to the external device 200. When the electronic device 100 is disconnected from the external device 200, it stops the supply of power to the external device 200 via the connector 110.

Although the embodiment shown in FIG. 3 is described in such a way that the first voltage and the second voltage are 5 V and 4.3 V, respectively, it should be understood that the present disclosure is not limited thereto, rather it should be understood that the first and second voltages may be set depending on types of the external devices connected to the electronic device.

Figure 4A:
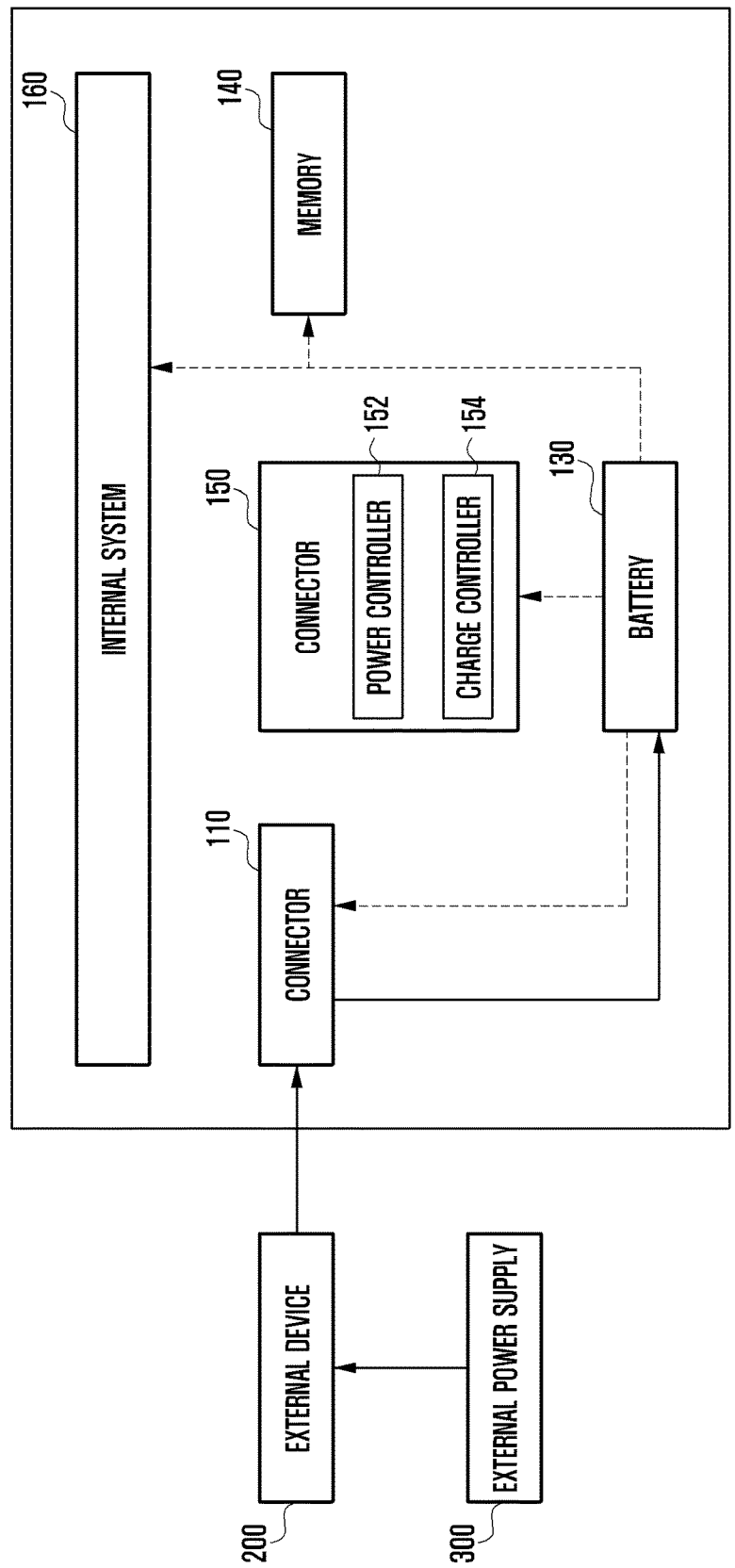
FIG. 4A is a diagram illustrating the operation of an electronic device according to the first embodiment of the present disclosure.
Figure 4B:
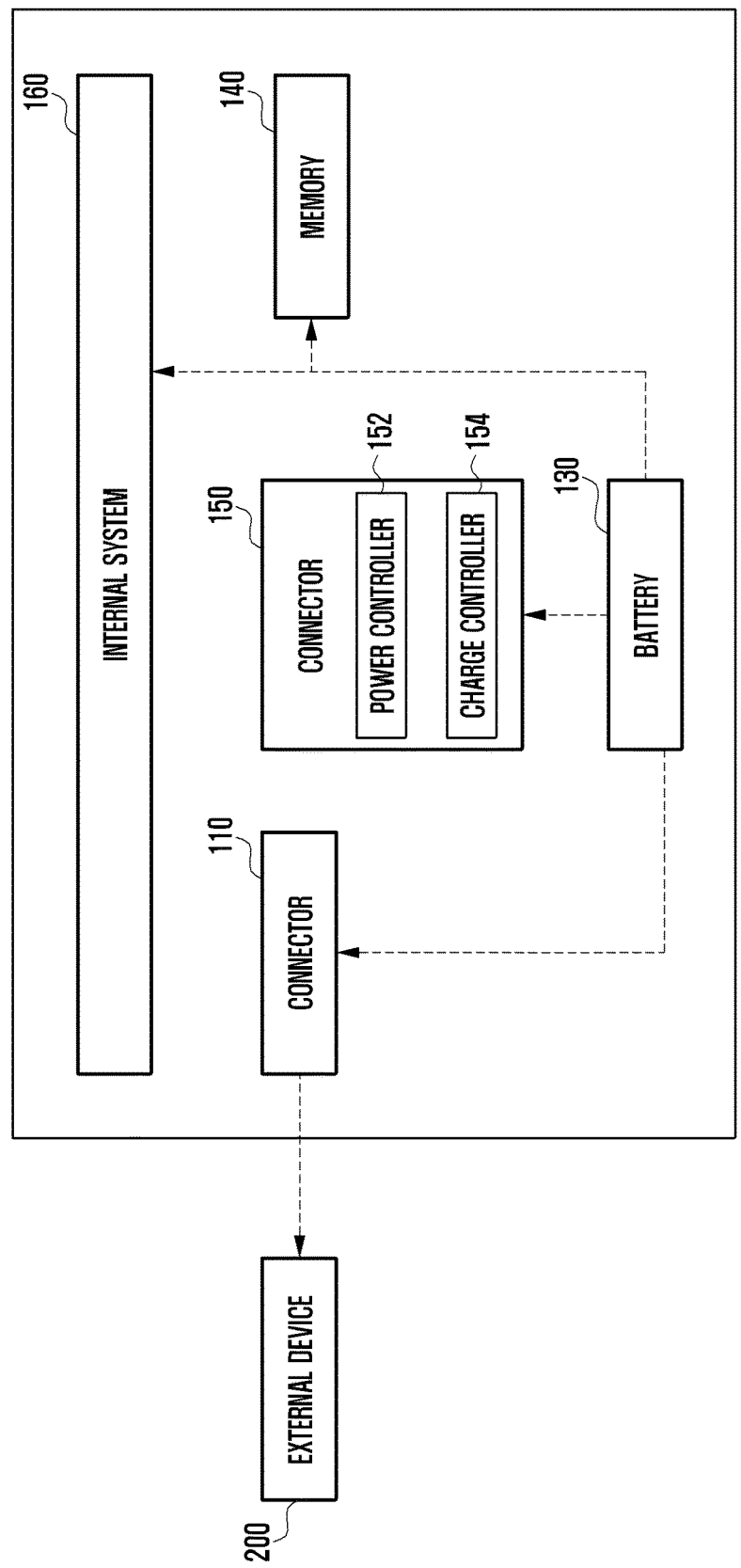
FIG. 4B is a diagram illustrating the operation of an electronic device according to the first embodiment of the present disclosure.

FIGS. 4A and 4B are diagrams that describe a power supply method of an electronic device 100 when an external device 200 and an external power supply 300 are connected or disconnected thereto, according to the first embodiment of the present disclosure. In FIGS. 4A and 4B, the bold lines indicate the flow of current due to the output power of the external power supply 300 and the dashed line indicates the flow of current due to the output power of the battery 130.

FIG. 4A is a diagram illustrating the operation of an electronic device, according to the first embodiment of the present disclosure. More particularly, FIG. 4A illustrates the flow of current when the electronic device 100 is connected to the external device 200 and the external power supply 300. As shown in FIG. 4A, the external power supply 300 supplies power to the external device 200. Power is also supplied from the external power supply 300 to the electronic device 100 via the connector 110 of the electronic device 100. In this case, the charge controller 154 may charge the battery with power obtained from the external power supply 300.

Although the external power supply 300 is connected to the external device 200, power required for operations of the electronic device 100 may be supplied to the battery 130. For example, as shown in FIG. 4A, the memory 140 and the internal system 160 in the electronic device 100 receive power output from the battery 130 according to the control of the power controller 152. In addition, power from the battery 130 may also be provided, as a second voltage, to the connector 110.

FIG. 4B is a diagram illustrating the operation of an electronic device, according to the first embodiment of the present disclosure. More particularly, FIG. 4B illustrates the flow of current when the external power supply 300 is disconnected. When the external power supply 300 is disconnected, the electronic device 100 activates a reverse boost function in a first mode. Therefore, the output power of the battery 130 is supplied to the external device 200. The internal system of the electronic device 100 also operates using the output power of the battery 130.

Figure 5:
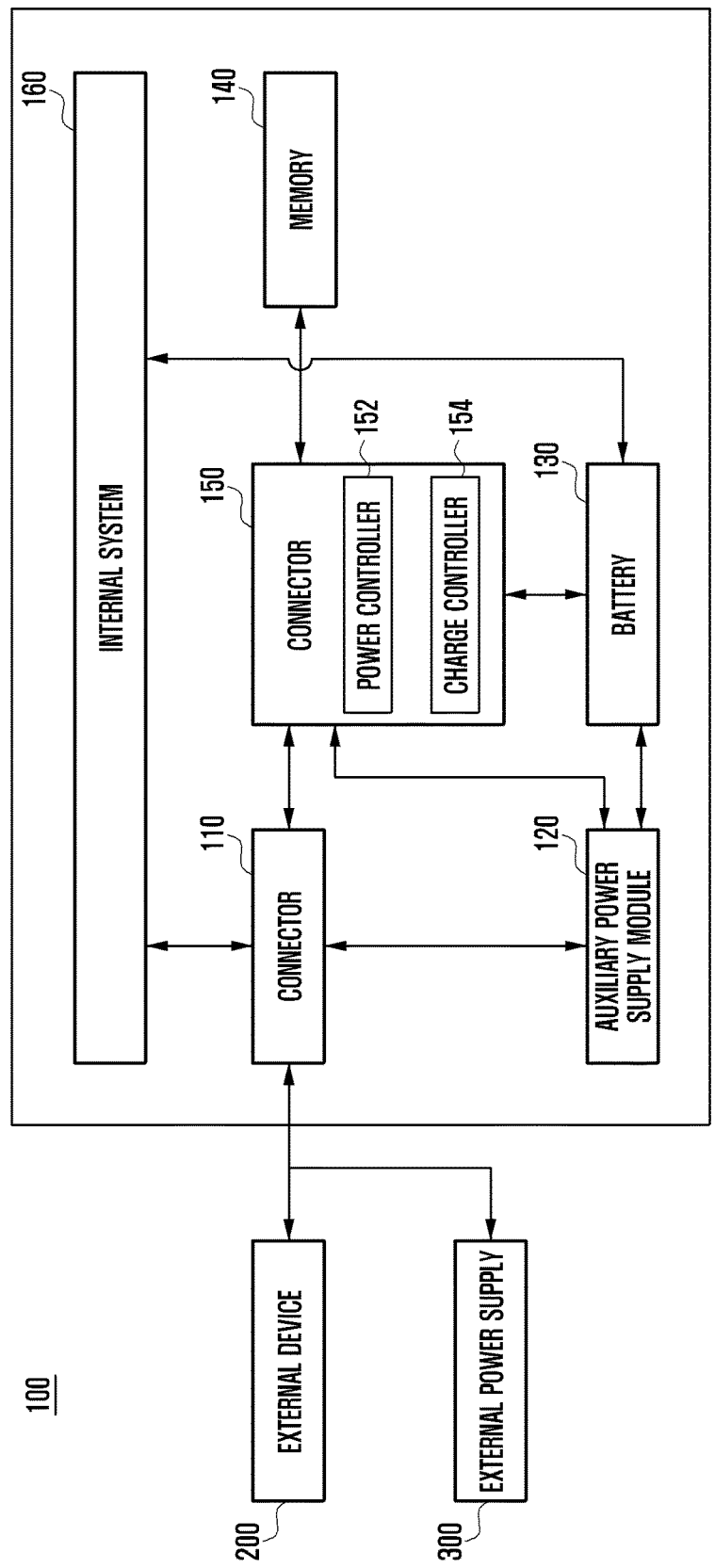
FIG. 5 is a diagram of an example of an electronic device according to a second embodiment of the present disclosure.

FIG. 5 is a diagram of an example of an electronic device, according to a second embodiment of the present disclosure.

The second embodiment and the first embodiment shown in FIG. 2 differ from each other in that the electronic device 100 according to the second embodiment further includes an auxiliary power supply module 120. Therefore, the following description is provided regarding operations of the power controller 152, the charge controller 154 and the auxiliary power supply module 120 according to connection and disconnection between the external device 200 and the external power supply 300. The other components and their operations are the same as in the description provided with respect to FIGS. 2-4B.

The auxiliary power supply module 120 may step-up or step-down the voltage output by the battery 130 and providing the stepped-up or stepped-down voltage to the electronic device 100 and the external device 200 connected to the electronic device 100 so that the individual hardware components can operate. When the auxiliary power supply module 120 receives power from the battery 130, it may output different voltages to the individual hardware components.

The auxiliary power supply module 120 may determine the output voltage values according to the control of the controller 150. For example, when the connector 100 of the electronic device 100 is connected to the external device 200, the power controller 152 receives an interrupt signal according to connection with the external device 200. In this case, the power controller 152 activates a reverse boost function in a first mode to set power, to be supplied to the external device 200, as a first voltage. The auxiliary power supply module 120 may step up or step down the output voltage of the battery 130 and output the stepped-up or stepped-down voltage as the first voltage to the connector 110.

When the electronic device 100 detects that the external device 200 is connected to the external power supply 300, the power controller 152 activates a reverse boost function in a second mode to set power, supplied to the external device 200, as a second voltage that differs from the first voltage. The auxiliary power supply module 120 may step up or step down the output voltage of the battery 130 and output the stepped-up or stepped-down voltage as the second voltage to the connector 110. The auxiliary power supply module 120 charges its internal storage of a certain amount of power and provides the internal charged power to the external device 200.

Figure 6A:
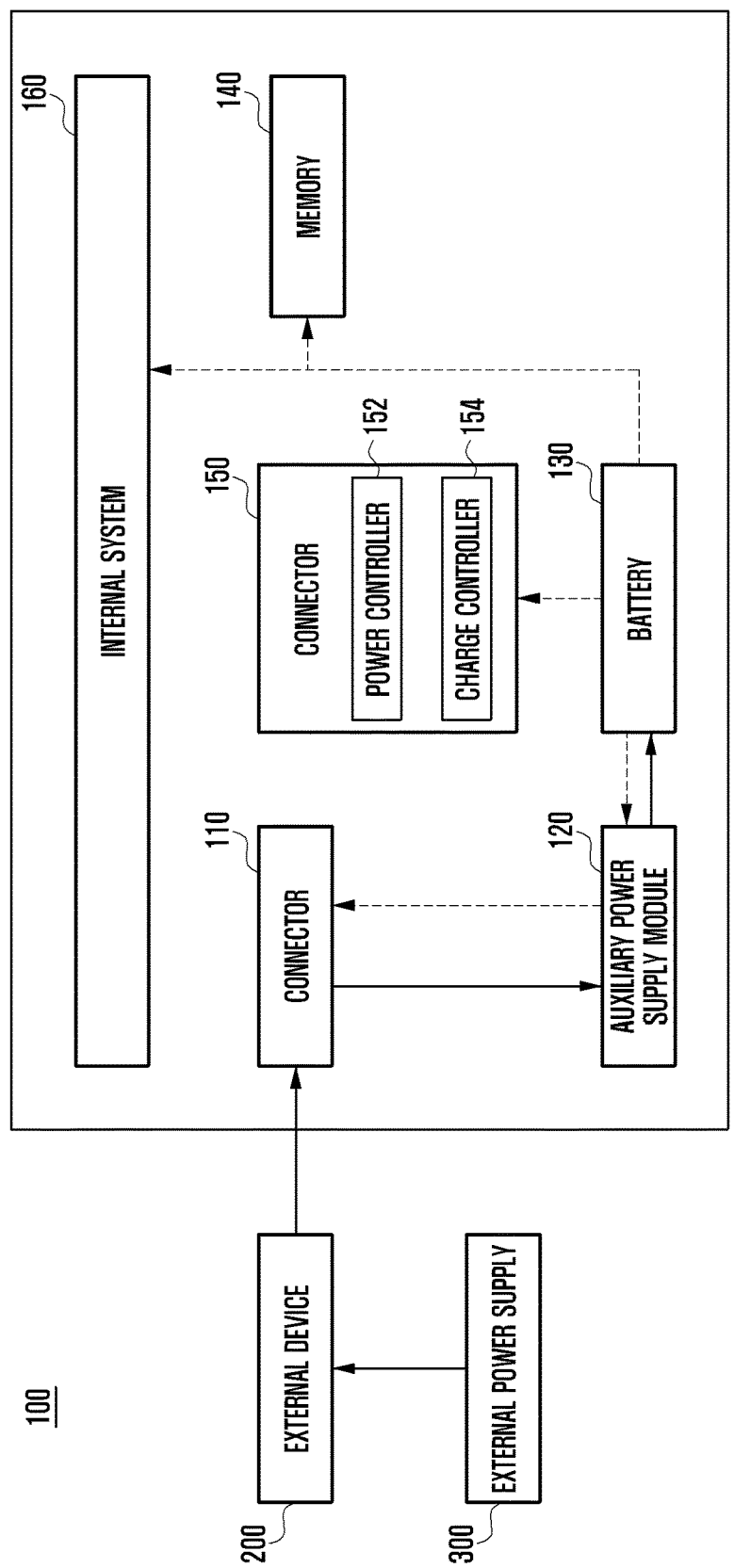
FIG. 6A is a diagram illustrating the operation of an electronic device according to the second embodiment of the present disclosure.
Figure 6B:
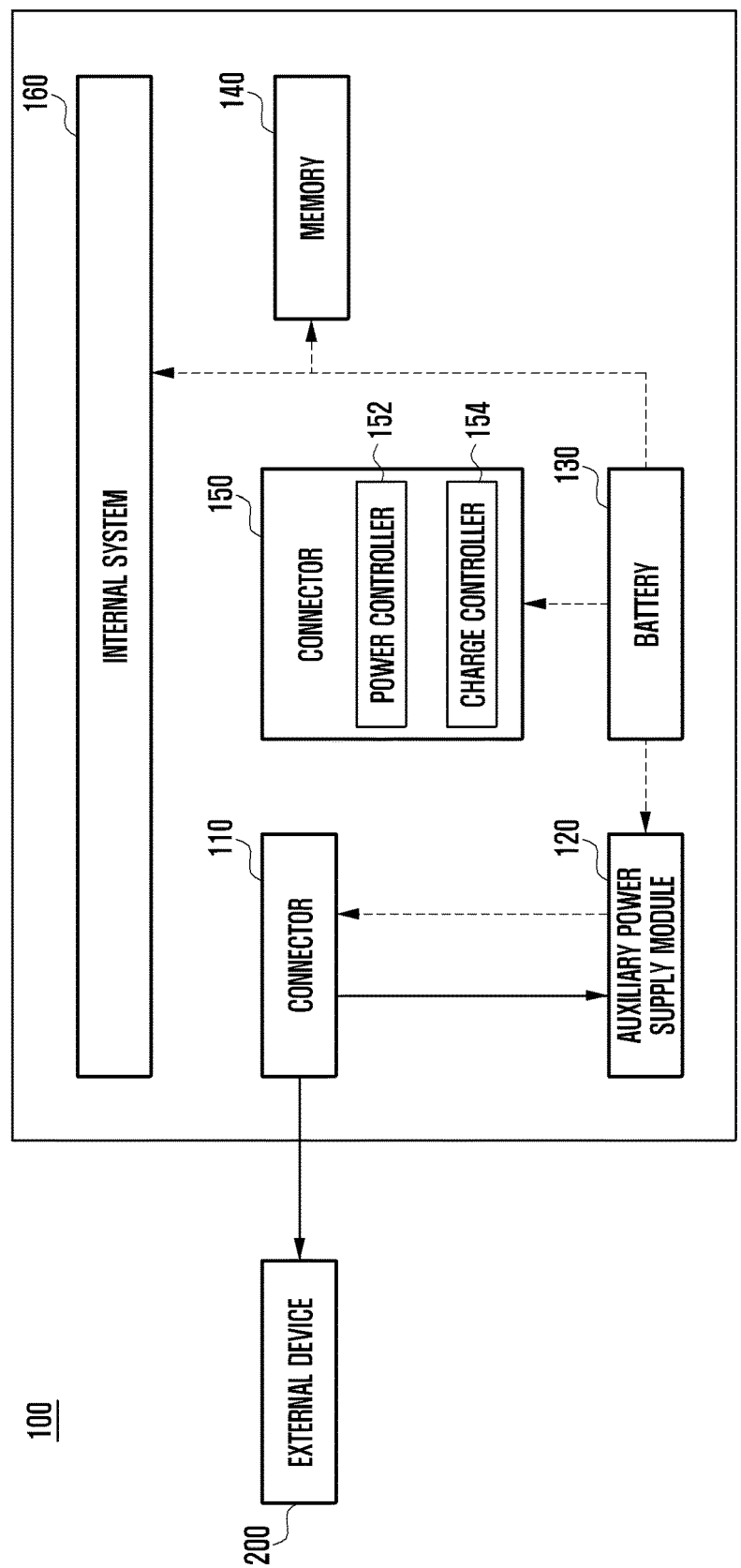
FIG. 6B is a diagram illustrating the operation of an electronic device according to the second embodiment of the present disclosure.
Figure 6C:
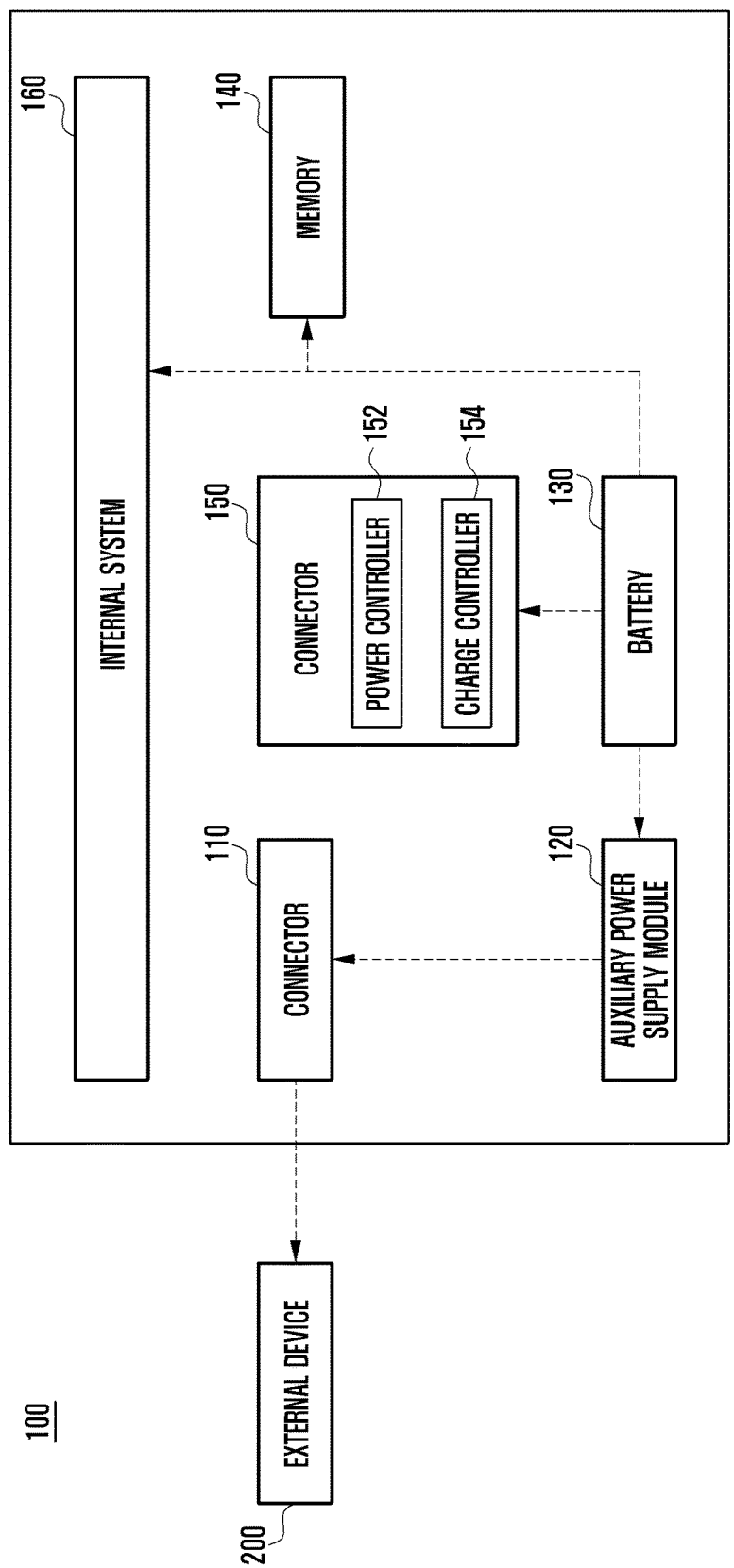
FIG. 6C is a diagram illustrating the operation of an electronic device according to the second embodiment of the present disclosure.

FIGS. 6A to 6C are diagrams illustrating the operation of the electronic device 100, according to the second embodiment of the present disclosure.

FIG. 6A is a diagram showing the flow of current when the electronic device 100 is connected to the external device 200 and the external power supply 300. The external power supply 300 supplies power to the external device 200. Power is also supplied from the external power supply 300 to the electronic device 100 via the connector 110 of the electronic device 100. The charge controller 154 may charge the battery 130 with power from the external power supply 300, and also charging the internal storage of the auxiliary power supply module 120.

Although the external power supply 300 is connected to the external device 200, the memory 140, the internal system 160, etc., in the electronic device 100 may receive power output from the battery 130 according to the control of the power controller 152. Power from the battery 130 may also be provided, as a second voltage, to the external device 200 via the connector 110.

FIG. 6B is a diagram showing the flow of current when the external power supply 300 is disconnected. When the external power supply 300 is disconnected, the auxiliary power supply module 120 may provide its internally charged power to the external device 200 via the connector 110. When all the internally charged power of the auxiliary power supply module 120 is consumed, the output power of the battery 130 may be provided to the external device 200 as shown in FIG. 6C.

Although it is not shown, it should be understood that the first and second embodiments may be modified to further include hardware/software modules to operate in a reverse boost first mode and a second mode according to a condition as to whether the electronic device is connected or disconnected from the external device and/or the external power supply.

According to various embodiments of the present disclosure, when the electronic device is connected to an external device via OTG and simultaneously with an external power supply and the external power supply supplies power to the external device and the electronic device, although the external power supply is disconnected, the electronic device may supply power to the external device without interruption, thereby maintaining connection with the external device.

Figure 7:
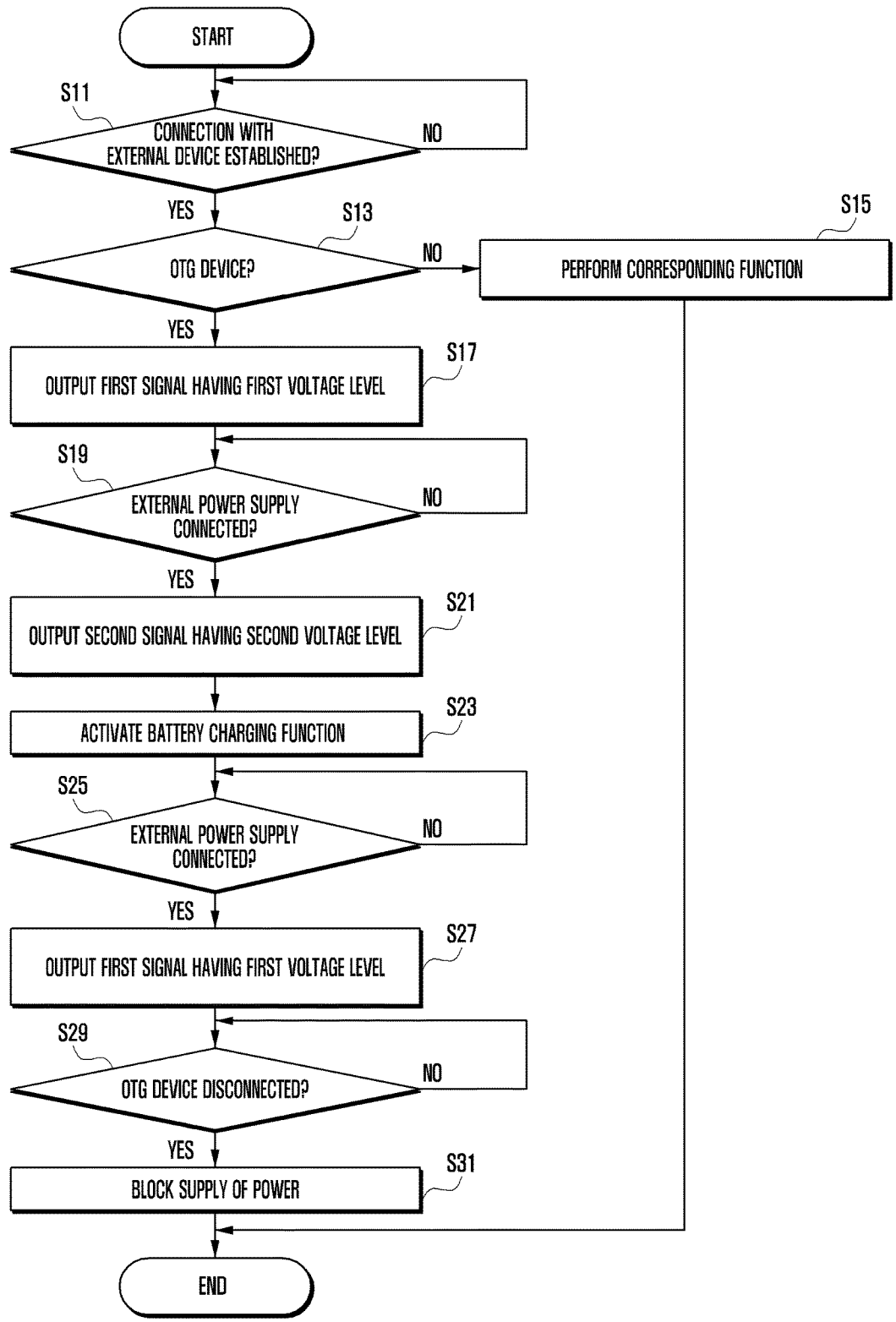
FIG. 7 is a flowchart of an example of a process according to an embodiment of the present disclosure.

FIG. 7 is a flowchart of an example of a process, according to an embodiment of the present disclosure.

The power supply control method is performed by the electronic device 100 described above with reference to FIGS. 2-5. Since the technical features of the electronic device 100 are already described above, the detailed description is omitted bellows.

When the electronic device is connected to an external device, it detects connection with the external device, based on an interrupt signal created in the connector in operation S11. The electronic device determines whether the connected external device is an OTG device and identifies, if the connected external device is an OTG device, a type of the external device in operation S13.

When the electronic device ascertains that the connected external device is not an OTG device but is an external device in operation S13, it activates a battery charging mode. When the electronic device ascertains that the external device is not an OTG device and an external power supply either in operation S13, it may perform a corresponding operation according to connection with an external device in operation S15. For example, when the electronic device ascertains that the connected external device is an HDMI device, it may receive multimedia data. In this case, when the external device does not receive power from the battery of the electronic device, it may operate using power output from an external power supply.

On the other hand, when the electronic device ascertains that the connected external device is an OTG device in operation S13, it activates a reverse boost function in a first mode. That is, the electronic device sets power, supplied by the battery, to a first voltage, and supplies the first voltage to the external device via the connector in operation S17. In other words, in operation S17, the electronic device may supply the external device with a first signal having a first voltage level. The first signal may be generated by using the battery of the electronic device and it may be used to power the external device.

The electronic device detects whether the external power supply is connected to the external device or an OTG hub in operation S19. When the electronic device ascertains that the external power supply is connected to the external device or an OTG hub in operation S19, it activates a reverse boost function in a second mode. That is, the electronic device sets power, supplied from the battery, to a second voltage, and supplies the second voltage to the external device via the connector in operation S21. In other words, in operation S21, the electronic device may supply the external device with a second signal having a second voltage level. The electronic device may also a battery charging function to charge the battery with the input power of the external power supply.

It is preferable that the second voltage is smaller than the first voltage. The second voltage may be a pre-set voltage value. The second voltage may be set to a value greater than a minimum voltage required for operations of the external device which can be connected to the electronic device.

In another embodiment, the electronic device includes a memory. The memory stores identification information corresponding to at least one external device capable of connecting to the connector and a table mapping the identification information to voltage values. When the electronic device identifies a voltage value that is mapped to the identification information corresponding to the connected external device, it is capable of setting the identified voltage value as a second voltage.

When the electronic device ascertains that the external power supply is disconnected in operation S25, it activates the reverse boost function in a first mode and sets power, supplied from the battery, to a first voltage in operation S27. In other words, in operation S27, the electronic device may supply the external device with the first signal. The electronic device deactivates the battery charging function.

When the electronic device ascertains that the external device is disconnected in operation S29, it deactivates a reverse boost function to block the supply of power to the connector in operation S31.

As described above, when the electronic device is connected to an external device via OTG and also with an external power supply and the external power supply supplies power to the external device and the electronic device, although the external power supply is disconnected, the power supply control method according to an embodiment of the present disclosure is capable of supplying power from the electronic device to the external device without interruption, thereby maintaining the connection between the electronic device and the external device.

According to various embodiments of the present disclosure, when an electronic device is connected to an external device via OTG and also with an external power supply, although the external power supply which is supplying power to the external device is disconnected, the power supply control method is capable of maintaining the connection between the electronic device and the external device. The electronic device is adapted to the method.

Modules or programming modules according to the present disclosure may include one or more components, remove part of them described above, or include new components. The operations performed by modules, programming modules, or the other components, according to the present disclosure, may be executed in serial, parallel, repetitive or heuristic fashion.

FIGS. 1-7 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

The invention claimed is:

1. An electronic device comprising:
a connector for connecting to an external device;
a battery; and
a controller operatively coupled to the connector and the battery, the controller including a power controller configured to:
generate a first power having a first voltage level from an output power of the battery and supply the first power to the external device via the connector, in response to detecting that the external device is connected to the connector; and
generate a second power having a second voltage level lower than the first voltage level from the output power of the battery and supply the second power to the external device via the connector, in response to detecting that the external device connected to the connector is further connected to an external power supply.

2. The electronic device of claim 1, further comprising a memory storing an indication of the second voltage level, wherein the controller is configured to retrieve the indication of the second voltage level from the memory, and supply the second power based on the indication of the second voltage level.

3. The electronic device of claim 1, wherein the second voltage level is greater than or equal to a minimum voltage level required to operate the external device.

4. The electronic device of claim 1, further comprising a memory configured to store an identifier corresponding to the external device and a data structure mapping the identifier to one or more voltage levels, wherein the power controller is further configured to detect that the external power supply is connected to the external device, and identify the second voltage level based on the data structure.

5. The electronic device of claim 1, wherein the controller further comprises a charge controller for charging the battery with power provided by the external power supply when the external power supply is connected to the external device.

6. The electronic device of claim 1, wherein the first power is provided to the external device only when the external device is an On-The-Go (OTG) device.

7. The electronic device of claim 1, wherein the connector is configured to generate an interrupt signal when at least one of the external device and the external power supply is connected or disconnected and outputs the interrupt signal to the power controller.

8. The electronic device of claim 1, further comprising an auxiliary power supply configured to adjust a voltage level provided by the battery to the first voltage level or the second voltage level and provide the first power or the second power to the external device.

9. A method for use in an electronic device comprising:
   detecting a connection with an external device from a connector of the electronic device;
   generating a first power having a first voltage level from an output power of a battery of the electronic device and supplying the first power to the external device via the connector, in response to detecting the connection; and
   detecting that the external device is further connected to an external power supply; and
   generating a second power having a second voltage level lower than the first voltage level from the output power of the battery and supplying the second power to the external device via the connector, in response to detecting that the external device is further connected to the external power supply.

10. The method of claim 9, further comprising retrieving an indication of the second voltage level from a memory, and wherein supplying the second power comprises supplying the second power based on the indication of the second voltage level.

11. The method of claim 9, wherein the second voltage level is greater than or equal to a minimum voltage level required to operate the external device.

12. The method of claim 9, further comprising: storing, in a memory, an identifier corresponding to the external device and a data structure mapping the identifier to one or more voltage values, wherein the second voltage level is identified based on the data structure.

13. The method of claim 9, further comprising, when the external power supply is connected to the external device, charging the battery with power provided by the external power supply.

14. The method of claim 9, wherein the first power is provided to the external device only when the external device is an On-The-Go (OTG) device.

15. A non-transitory computer-readable medium storing one or more processor-executable instructions, which when executed by at least one processor cause the processor to perform a method comprising the steps of:
   detecting a connection with an external device from a connector of an electronic device;
   generating a first power having a first voltage level from an output power of a battery of the electronic device and supplying the first power to the external device via the connector, in response to detecting the connection; and
   detecting that the external device is further connected to an external power supply; and
   generating a second power having a second voltage level lower than the first voltage level from the output power of the battery and supplying the second power to the external device via the connector, in response to detecting that the external device is further connected to the external power supply.

* * * * *